United States Patent
Wolf et al.

(10) Patent No.: US 11,477,546 B2
(45) Date of Patent: Oct. 18, 2022

(54) USER CONFIGURABLE REMOTE ENVIRONMENTAL MONITORING SYSTEM

(71) Applicant: Gary L. Sharpe, Naples, FL (US)

(72) Inventors: Kurt Wolf, Dublin, OH (US); Stephen Stock, Hilliard, OH (US); Kevin Watts, Columbus, OH (US); Noah Thederahn, Galloway, OH (US); Harry Langley, Washington Court House, OH (US)

(73) Assignee: Gary L. Sharpe, Naples, FL (US)

( * ) Notice: Subject to any disclaimer, the term of this patent is extended or adjusted under 35 U.S.C. 154(b) by 0 days.

(21) Appl. No.: 16/900,356

(22) Filed: Jun. 12, 2020

(65) Prior Publication Data

US 2020/0396523 A1 Dec. 17, 2020

Related U.S. Application Data

(60) Provisional application No. 62/860,550, filed on Jun. 12, 2019.

(51) Int. Cl.
*H04Q 9/00* (2006.01)
*G01K 1/024* (2021.01)
*G01K 3/00* (2006.01)

(52) U.S. Cl.
CPC ............... *H04Q 9/00* (2013.01); *G01K 1/024* (2013.01); *G01K 3/005* (2013.01); *H04Q 2209/823* (2013.01)

(58) Field of Classification Search
CPC ........................................................ H04Q 9/00
See application file for complete search history.

(56) References Cited

U.S. PATENT DOCUMENTS

| | | | | |
|---|---|---|---|---|
| 2018/0305091 A1* | 10/2018 | Krafft | .................... | B65D 43/26 |
| 2019/0017719 A1* | 1/2019 | Sinha | ...................... | G05B 15/02 |
| 2020/0191896 A1* | 6/2020 | Valencia | ............... | G01S 5/0284 |
| 2020/0288218 A1* | 9/2020 | Cates | ...................... | G01K 1/022 |
| 2020/0387863 A1* | 12/2020 | Ruth | .................... | G06Q 10/087 |

OTHER PUBLICATIONS

Stanley Healthcare, AeroScout Links Cloud Temperature Monitoring, https://www.stanleyhealthcare.com/hospital-clinics/aeroscout-links-cloud-monitoring, accessed Dec. 31, 2020, 5 pages, USA.

(Continued)

*Primary Examiner* — Joseph H Feild
*Assistant Examiner* — Pameshanand Mahase
(74) *Attorney, Agent, or Firm* — Standley Law Group LLP; Jeffrey Standley; Beverly Marsh

(57) ABSTRACT

Devices, systems and method for remotely monitoring temperature and humidity are disclosed. Sensor units are capable of reading temperature experienced by liquid pharmaceuticals. Each of a plurality of sensor units may be placed in a variety of locations and communicate temperature data to one or more controllers. Controllers also monitor ambient temperature and humidity. Collected data is transmitted over a network, and monitored according to user-configurable policies and workflows. Alerts and notifications may be generated according to workflows and user devices receive notifications.

20 Claims, 26 Drawing Sheets

(56) References Cited

OTHER PUBLICATIONS

Stanley Healthcare, Stanley Healthcare Launches Cloud-Based IoT Monitoring Platform, https://www.stanleyhealthcare.com/stanley-healthcare-launches-cloud-based-iot-platform, accessed Jan. 4, 2021, 3 pages, USA.

Stanley Healthcare, Mobileview 5 Most Advanced Software Platform for Unified Asset Visibility Management, https://stanleyhealthcare.com/sites/stanleyhealthcare.com/files/2019-06/MobileView%205.x%20Data%20Sheet.pdf, Jun. 18, 2019, 4 pages, Waltham, MA, USA.

Stanley Healthcare, AeroScout Links Temperature Monitoring Cloud-based wireless monitoring, https://stanleyhealthcare.com/sites/stanleyhealthcare.com/files/2020-04/DOC-12-85074-AA_AeroScout%20Links%20COVID-19.pdf, Janaury 4, 2021, 2 pages, Portsmouth, NH, USA.

Stanley Healthcare, AeroScout Links Cloud-based IoT platform monitoring the environment of care, https://stanleyhealthcare.com/sites/stanleyhealthcare.com/files/2020-01/DOC-12-85060-AC_AeroScout%20Links%20Solution%20Overview%202020.pdf, Jan. 4, 2020, 2 pages, Portsmouth, NH, USA.

* cited by examiner

| Status | Name | Controller | Correct Responses | Correct Reconnects | Last Read At |
|---|---|---|---|---|---|
| | Peds Pharmacy Ambient | Peds Probe | | | 2/16/2020 12:44:02 pm |
| | Peds White Fridge | Peds Probe | | | 2/16/2020 12:05:54 pm |
| | Peds Gray Fridge | Peds Probe | | | 2/16/2020 12:59:00 pm |
| | ER Lab Ambient | ER-1 | | | 2/16/2020 3:58:26 pm |
| | Hem Lab A Ambient | Hem-3 | | | 2/16/2020 3:58:36 pm |
| | Cardio Lab Ambient | 6245-042 | | | 2/16/2020 12:58:00 pm |
| | Green Pharm Amb | GrPharm | | | 2/16/2020 12:45:02 pm |
| | Ob Lab Ambient | OB Probe 2 | | | 2/16/2020 12:56:00 pm |

FIG. 12

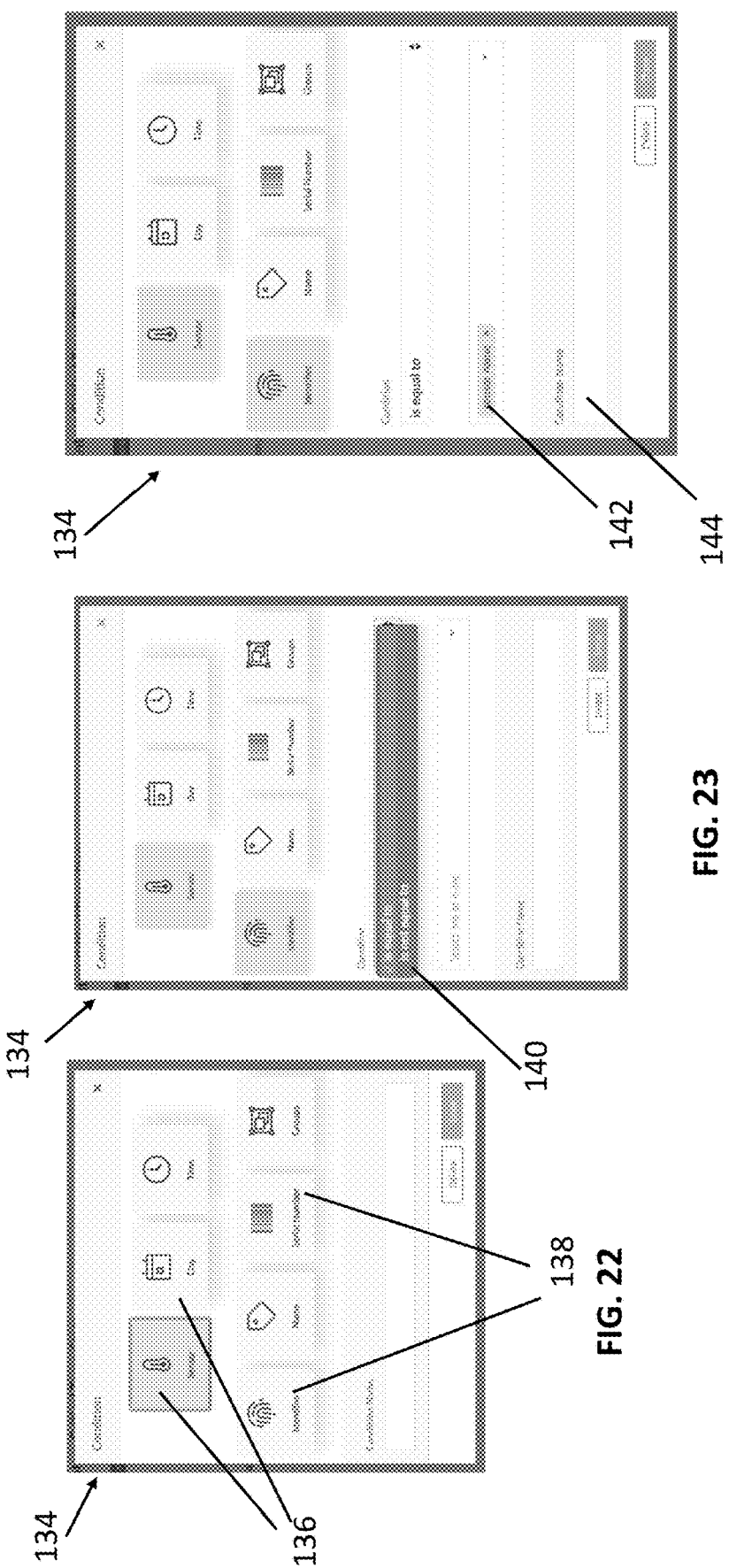

USER CONFIGURABLE REMOTE ENVIRONMENTAL MONITORING SYSTEM

CROSS-REFERENCE TO RELATED APPLICATIONS

This application claims priority to U.S. Provisional Application No. 62/860,550 filed 12 Jun. 2019, the content of which is hereby incorporated by reference as if fully recited herein.

TECHNICAL FIELD

Exemplary embodiments relate generally to an environmental monitoring system. More particularly, exemplary embodiments relate to a temperature and humidity monitoring system that can be configured by a user to monitor multiple remote environments and provide notifications according to a user-defined policies and workflows.

BACKGROUND OF THE INVENTION

In hospital and clinical settings, a significant number of pharmaceuticals and other medical items must be closely monitored to ensure that they are being stored at the proper temperature. If the temperature of certain items is too warm or too cold it can have undesirable effects on their efficacy and render them unusable and unsafe for patients. Furthermore, some pharmaceutical products may be required to be administered to a patient within a certain amount of time after they have been removed from refrigeration. Proper refrigeration of certain pharmaceuticals is desirable, and monitoring temperatures both inside a refrigerator or freezer, as well in the ambient environment of a facility is important to ensure that effective drugs are safely delivered to patients. Ensuring proper humidity levels is also important. Humidity levels can impact the spread of bacterial, respiratory problems, the occurrence of electromagnetic charges, and the general comfort of staff and patients. Humidity levels can also impact the stability of drugs and medical supplies.

It is often difficult to achieve consistent monitoring of temperature and humidity around a facility, and ensure that the proper persons are aware of any undesirable temperature or humidity levels. Many medical facilities have numerous refrigerators or freezers storing pharmaceuticals, and may otherwise store pharmaceuticals in a variety of locations. Depending on their intended contents, different refrigerators or freezers may be set at different temperatures to maintain efficacy and safety of different types of pharmaceuticals. Different rooms or departments may have different optimum humidity levels. Further complicating matters, many facilities run multiple work shifts throughout the day and night, and depending on both the day of the week and time of day different personnel may be responsible for monitoring temperature and humidity.

SUMMARY OF THE INVENTION

According to one exemplary embodiment of the inventive concept, an environmental monitoring system comprises at least one controller that is configured to receive temperature data from at least one temperature sensor and transmit the temperature data over a network to a server. A server in communication with the network is configured to receive temperature data from one or more controllers, and receive or otherwise execute an environmental policy for at least one temperature sensor associated with one of the controllers. An environmental policy identifies a first status associated with a first temperature range and a second status associated with a second temperature range. The environmental policy may also identify different read frequencies for a sensor depending on the temperature range and resulting status. The server is also configured to receive or otherwise execute a workflow associated with at least one temperature sensor. The workflow requires the server to initiate at least one action when notified that at least one temperature sensor has read temperature data that falls within the second temperature range and therefore invokes the second status. In an exemplary embodiment the first status may be "normal", whereas the second status may be "critical." The server compares the environmental policy with the temperature data to identify whether a sensor has the second status. If the second status is in effect for a temperature sensor, the server executes the workflow and initiates the at least one action set forth in the workflow. The action may be to issue a notification of the sensor status to a user device, which may be provided in a variety of means including text message, e-mail, SMS, or voicemail. A notification may be an audible notification.

The server may transmit an environmental policy to a controller to be stored in the controller's internal data storage. The one or more controllers and the one or more temperature sensors may be remotely located from the server, and the controller may communicate with the server over a wireless or cellular network. The at least one temperature sensor may be comprised of a vessel containing a volume of thermal buffer, which may be a liquid medium such as propylene glycol, that mimics the temperature properties of a pharmaceutical product.

According to another embodiment of the inventive concept, a method for environmental monitoring comprises receiving environmental policy instructions from a user device, where the environmental policy instructions pertain to an environmental property detected by a sensor, such as temperature or humidity, and include status instructions that establish a first sensor status category and a second sensor status category. The method further comprises receiving a workflow associated with the first sensor status category, the workflow identifying at least one action, initiating a read of environmental data by the sensor, receiving environmental data from the sensor, comparing the environmental data with the status instructions to determine if the sensor device has the second sensor status category, and performing at least one action if the sensor device has the second sensor status category. The at least one action may comprise transmitting a notification of the second sensor status category to a user device, or initiating an audible alarm. The workflow may identify a first of the at least one action to occur upon the existence of a first calendar event, and a second action that occurs upon the existence of a second calendar event, where the first and second calendar events are defined at least part by the day of the week.

According to another exemplary embodiment of the inventive concept, a user-configurable remote monitoring system comprises first and second temperature sensors in communication with a controller, and a server configured to receive a variety of information from a user device comprising first and second collections of user selections, the first and second collections of user selections each comprising at least one sensor status defined by a temperature range, and the first and second collections of user selections defining a first and second environmental policy, respectively; at least one workflow comprising at least one action to be executed upon the existence of a particular sensor status; instructions to apply said first environmental policy to said first temperature sensor and the second environmental policy to the second temperature sensor. The server is further configured to receive from the controller temperature data associated with the first and second temperature sensors; compare the temperature data against the first and second environmental policy and identify whether one of said at least one sensor status applies to the first and second temperature sensors; and apply said workflow and execute the at least one action if said particular sensor status exists for either said first or said second temperature sensor. The at least one action may comprise transmitting a notification of said particular sensor status to one or more user devices. The workflow may identify a first of said at least one action associated with the existence of a first calendar event, and a second of the at least one action associated with the existence of a second calendar event, where the first and second calendar events may be defined at least in part by the day of the week.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which:

FIG. 12 is an example sensor page according to an exemplary embodiment;

FIG. 22 is an example of a window for establishing a workflow condition based on a sensor;

FIG. 23 is the exemplary window of FIG. 22 showing the creation of a workflow condition;

FIG. 24 is the exemplary window of FIG. 22 showing the further creation of a workflow condition;

DETAILED DESCRIPTION

Figure 1:
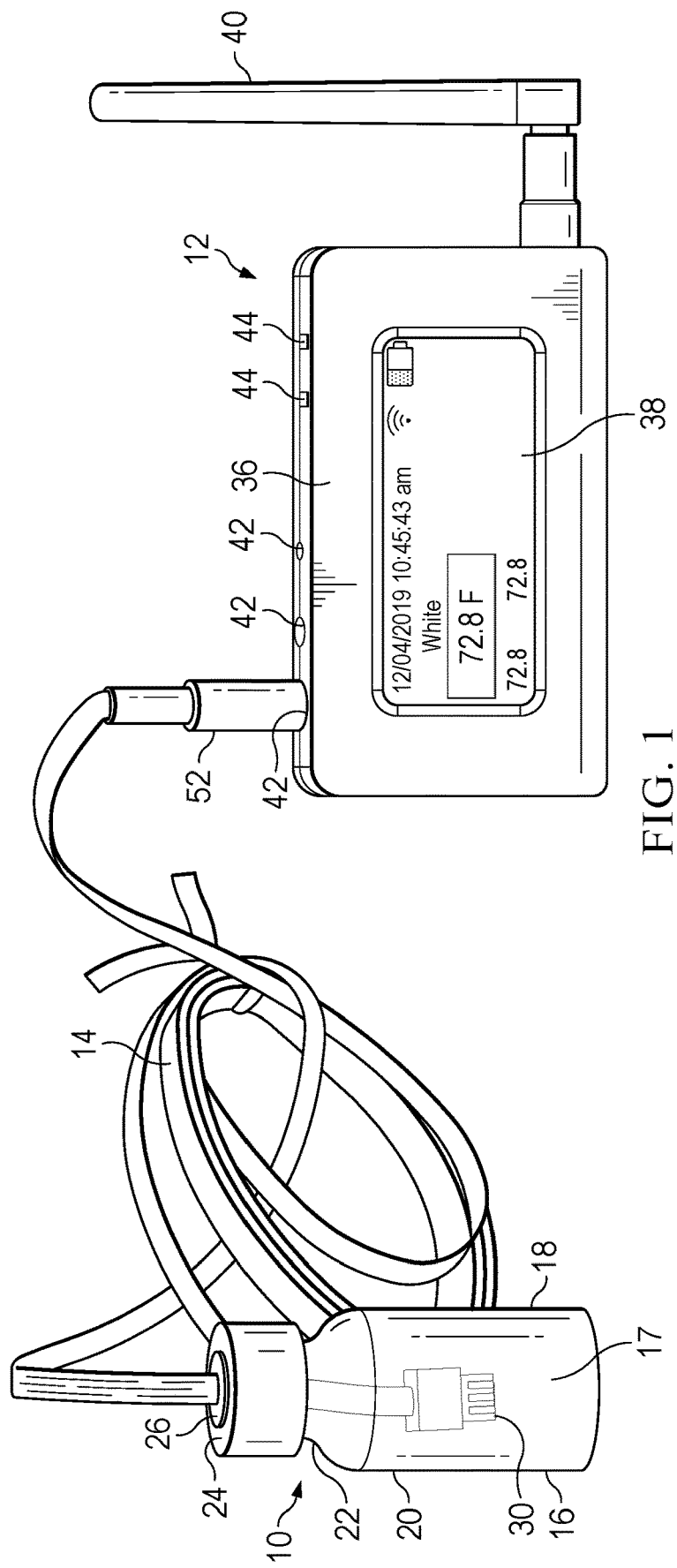
FIG. 1 is a perspective view of an exemplary controller and sensor unit according to the inventive concept.
Figure 2:
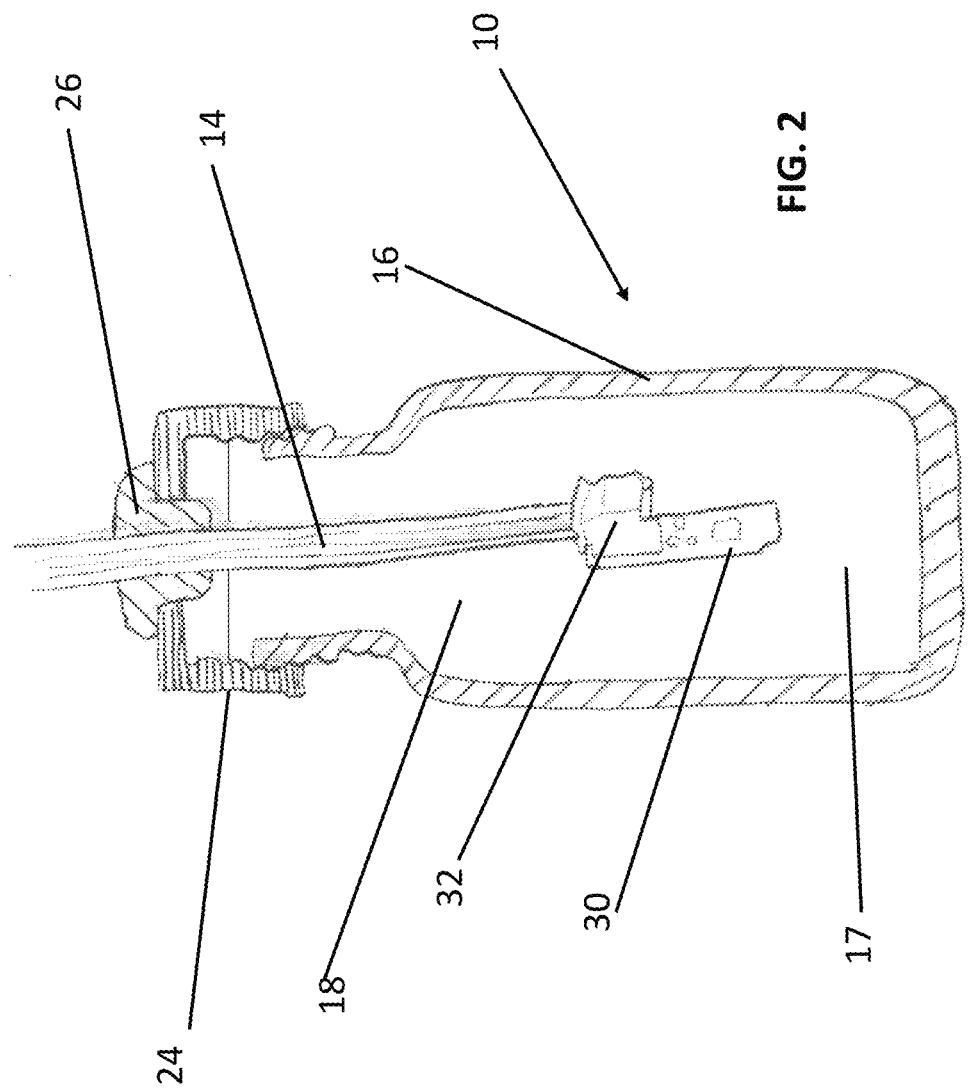
FIG. 2 is a cross-sectional view of the sensor unit of FIG. 1.

Directing attention to FIG. 1, an exemplary embodiment of a sensor unit 10 and a controller 12 is illustrated. The sensor unit 10 is connected to the controller 12 via a length of cable 14. The sensor unit 10 reads temperature data and transmits the temperature data to the controller 12 through the cable 14. Referring to FIG. 2, the exemplary sensor unit 10 of FIG. 1 is comprised of a vessel 16 containing a volume of thermal buffer 17 that may be comprised of a liquid medium 18. The vessel has a body 20 and a threaded neck portion 22 defining an open end of the vessel 16. A cap 24 and plug 26 assembly may be connected to the threaded neck 22 and intersected by the cable 14. The cap 24 and plug 26 assembly is formed to engage with the threaded neck 22 of the vessel 16 and provide a tight seal around both the open end of the vessel 16 and cable 14, such that the thermal buffer 17 is contained within the vessel 16.

Inside the vessel 16 is a temperature sensor 30, which is used to detect the temperature of the surrounding thermal buffer 17. The sensor 30 may be a silicone-based digital temperature sensor, such as, for example, Model TMP117 from Texas Instruments. One of ordinary skill in the art will recognize that a variety of temperature sensors from a variety of sources could be utilized. The sensor 30 may be connected to the end of the cable 14 via a removable connector 32. The sensor 30 reads the temperature of the surrounding thermal buffer 17 and transmits temperature data through the cable 14 to the controller 12. The sensor 30 may read and transmit temperature data upon being instructed by the controller 12, which may occur according to a predetermined interval of time. In other exemplary embodiments, the sensor 30 may continuously read and transmit temperature data to the controller.

In an exemplary embodiment it is desirable for the sensor to identify the internal temperature experienced by a refrigerated vaccine or other liquid substance. Accordingly, the vessel may be an artificial pharmaceutical product that mimics the internal properties of an authentic pharmaceutical product. The vessel 16 may be constructed of materials that mimic the properties of a vaccine bottle or vaccine syringe. In an exemplary embodiment the vessel 16 may be made of glass, and the liquid medium 18 may be propylene glycol. However, in other exemplary embodiments the vessel 16 may be made from plastic or other materials, and the thermal buffer may be one or more of a variety of substances that consist of or mimic the properties of a vaccination or other substance, including but not limited to glass beads, plastic beads, or beads filled with liquid.

Figure 3:
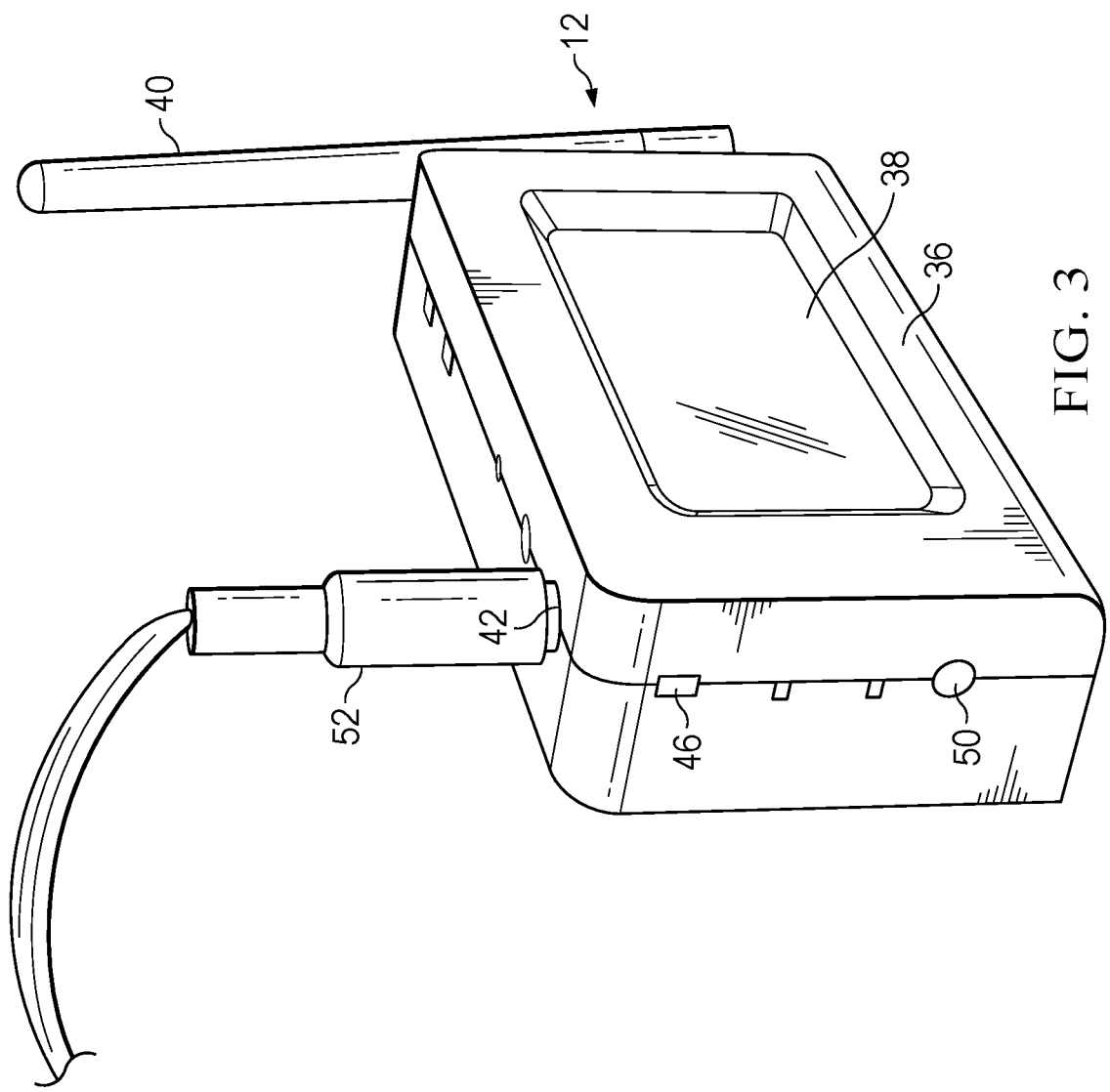
FIG. 3 is a left-side perspective view of the controller of FIG. 1.
Figure 4:
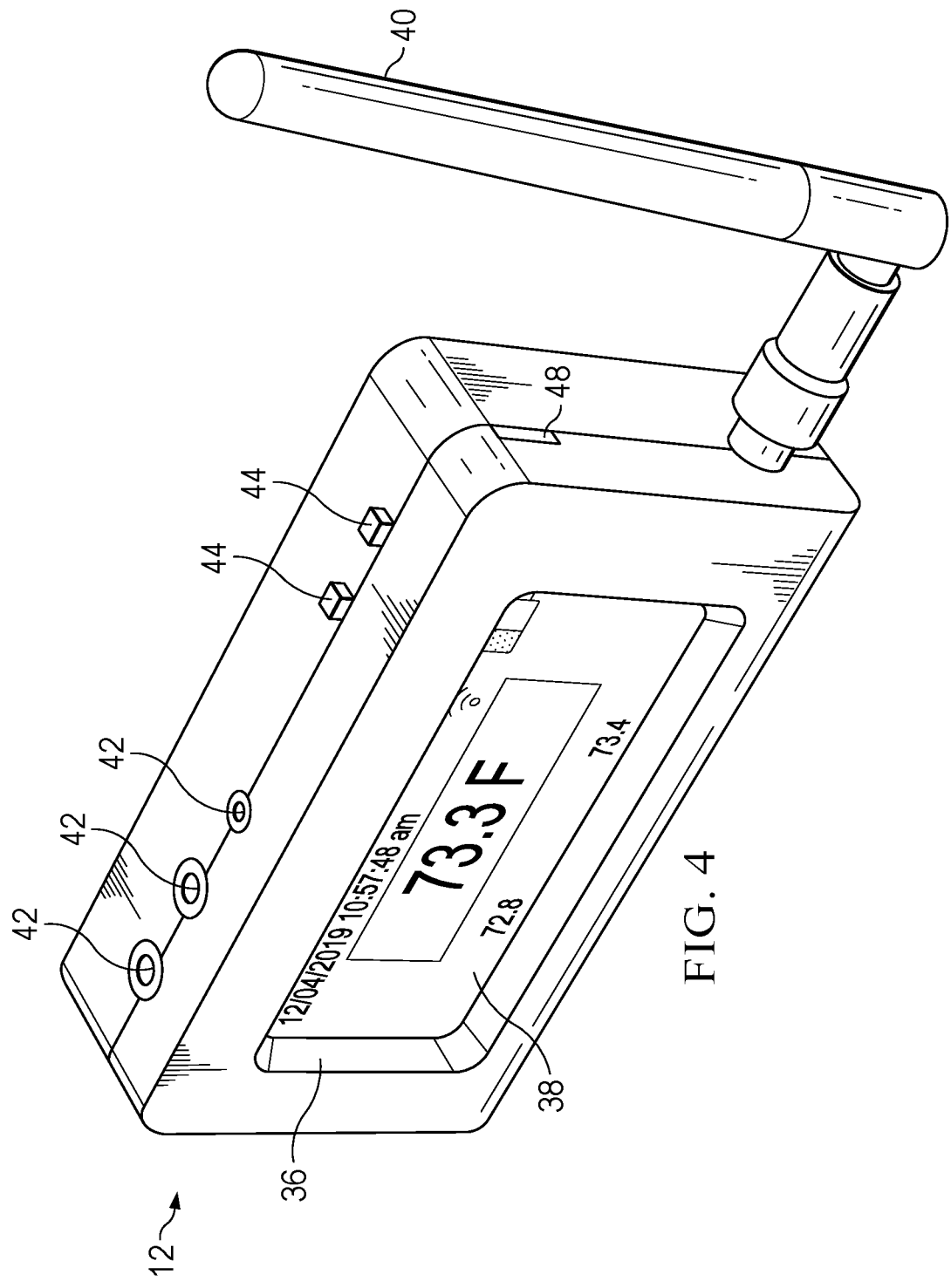
FIG. 4 is a right-side perspective view of the controller of FIG. 1.

The controller 12 is comprised of an outer housing 36, a display screen 38, and an external antenna 40. Referring to FIGS. 3 and 4, the controller 12 has multiple sensor ports 42, one or more menu buttons 44 to facilitate operation of the controller 12, an on/off switch 46, a charging port 48, and a light 50 for providing visual notifications to a user. The end of a cable 14 that is not in the sensor unit 10 may terminate in a plug 52 that may be removably connected to a sensor port 42 on the controller 12. The antenna 40 may be a screw mount antenna that is removable, and may be bendable. In other exemplary embodiments there may be an internal antenna in addition to or in lieu of an external antenna.

The controller 12 may communicate with one or more sensor units 10, receive temperature data from one or more sensor units 10, and communicate via the display screen 38 a variety of information to a user, including temperature information and information about the sensors. For example, the controller 12 may display the current temperature detected by the sensors, historical information such as high/low temperatures over a certain time period, and identify sensor units by name, location, or number. Information about all of the associated sensors, or a subset of the sensors, may be displayed on the display screen 38. The controller 12 may display information regarding sensor policies, including what temperature range is normal or otherwise acceptable for a sensor unit depending on its intended location, and what higher or lower temperatures will cause a warning or be considered critically high or low. The controller 12 may also display information regarding battery life, WIFI and network properties, signal strength, and date/time information.

In an exemplary embodiment the display screen 38 of the controller 12 may utilize e-paper (electrophoretic) display technology for lower power consumption. In other exemplary embodiments the display screen may instead utilize different display technologies, such as LCD or OLED technology.

Exemplary controllers may be used in conjunction with multiple sensor units 10. In an exemplary setting, each of a plurality of sensor units may be placed in a different location, including but not limited to different refrigerators or freezer compartments in order to monitor the temperature of different environments. The sensor units may also be placed in the ambient environment if desired, for example, placed on top of a shelf or other surface in order to monitor room temperature. Cables connect each sensor units to one of the one or more controllers, and may be of any length desirable. The cables are preferably shaped so that they do not prevent refrigerator or freezer doors from closing when the sensors are placed inside, such as the ribbon cables illustrated in FIGS. 1, 2, and 5. Through the cables the one or more controllers receive temperature information from all of the sensor units. A single controller may be connected to multiple sensor units and receive temperature information for multiple environments. One of ordinary skill will recognize that the number of sensor ports on a controller may be modified to accommodate various numbers of sensor units, as well as adjusted in size, shape, and/or configuration to accommodate different cable plugs. In addition to sensor units that are typically placed inside refrigerators or freezers and may only read temperature information, the controller may also be associated with one or more ambient air sensors that monitor multiple environmental qualities for ambient air in a particular room, storage unit, or other location. Temperature, humidity, and other environmental factors may be measured and communicated to a controller by an ambient air sensor. In such a setting, a controller may be able to monitor internal environments of one or more refrigerators or freezers, as well as ambient air surrounding the controller. In an exemplary setting a controller associated with multiple sensor units and one or more ambient air sensors is able to monitor room temperature and humidity, as well as the internal temperature of a plurality of refrigerators.

Figure 5:
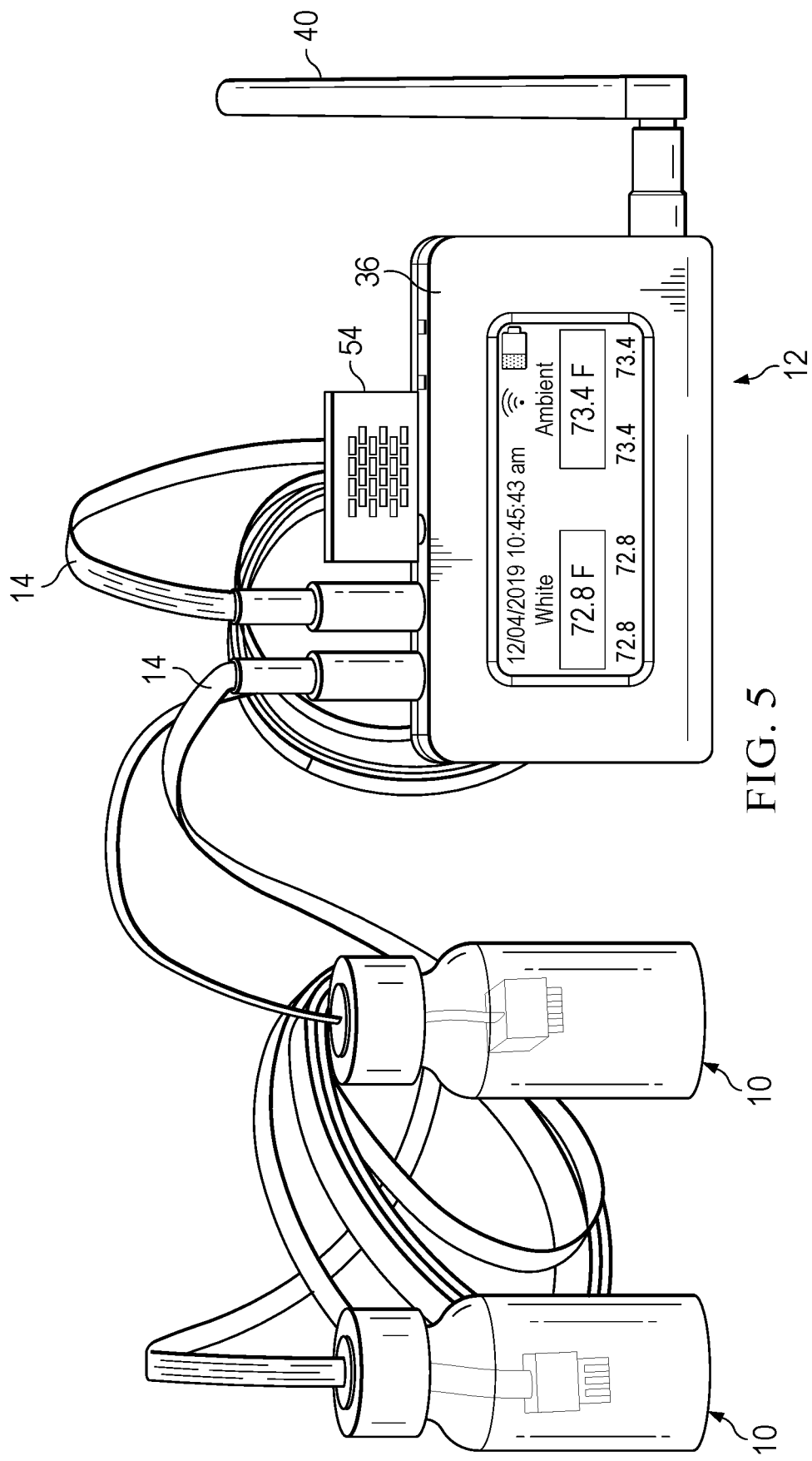
FIG. 5 is a front perspective view of the controller of FIG. 1 with two connected sensor units.

Referring to FIG. 5, the exemplary controller 12 is illustrated in use with two sensor units 10, each connected to the controller 12 via a designated cable 14 plugged into a respective sensor port 42. An ambient air sensor 54 is connected to the controller 12 via one of the sensor ports 42. The ambient air sensor 54 may detect both temperature and humidity of the air surrounding the controller 12. As illustrated by FIG. 5, the controller may display information received from both the ambient air sensor 54 and one or more of the sensor units 10. One of ordinary skill in the art will recognize that in other exemplary embodiments the controller 12 may communicate with various combinations of different types of sensors that detect one or more environmental properties. Furthermore, the controller 12 may communicate with sensors that are not physically connected via a cable or sensor port, such as through wireless or cellular means. In exemplary embodiments, different colored cables 14, caps 24, and/or plugs 26 may be used with different sensor units in order to assist with identification and reduce confusion.

Figure 6:
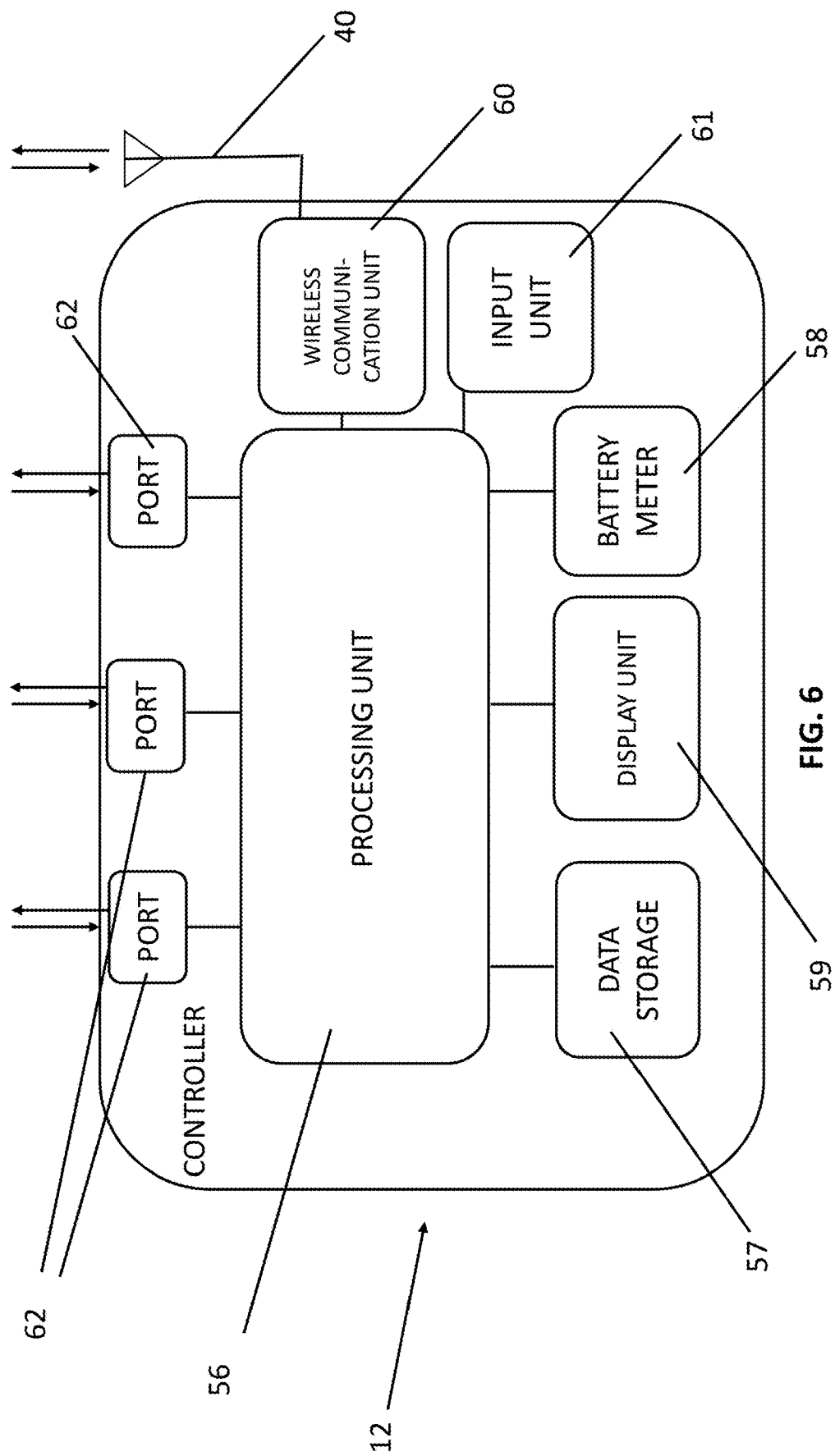
FIG. 6 is a block diagram illustrating components of an exemplary controller.

Referring to FIG. 6, internally, the controller 12 may be comprised of a variety of hardware components including a processing unit 56, data storage device (which may be an SD card) 57, and a digital battery meter 58. The data storage device 57 enables the controller 12 to store data received from one or more sensors such that a historical record of environmental data is available and can be accessed directly from the controller or transmitted across a network, or even downloaded directly to another device as needed. In some embodiments the controller may only store data when it is unable to access the network. For example, if there is a power outage or internet outage. A PCB may be configured to interface with the various components and support processor operations. Controller components may also include a display unit 59, a wireless communication unit 60, and an input unit 61. The wireless communication unit 60 is associated with an antenna 40 and allows the controller 12 to communicate information over a wireless network. The input unit 61 may include the menu buttons 44, or in other embodiments may include other types of buttons or keys that can be used by a user to input selections. In other embodiments the controller 12 may also include a sound card and one or more speakers to support the creation of audible notifications to a user. The processing unit 56 may communicate with one or more sensors connected through multiple ports 62 using serial communication protocol such as I$^2$C bus protocol. However, in other exemplary embodiments a variety of other communication protocols may be used, including a variety of serial and parallel communication protocols.

Figure 7:
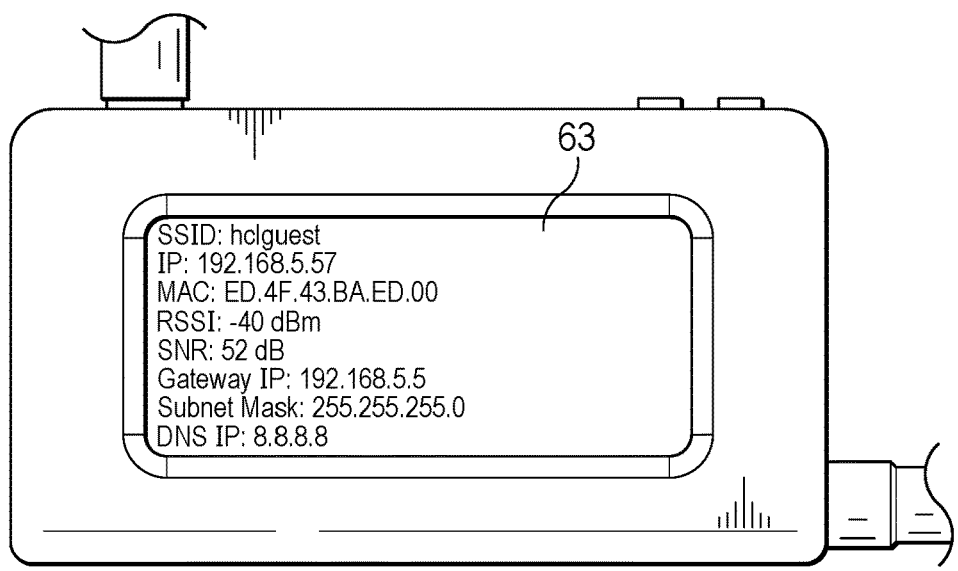
FIG. 7 is an exemplary screen of the controller of FIG. 1.
Figure 8:
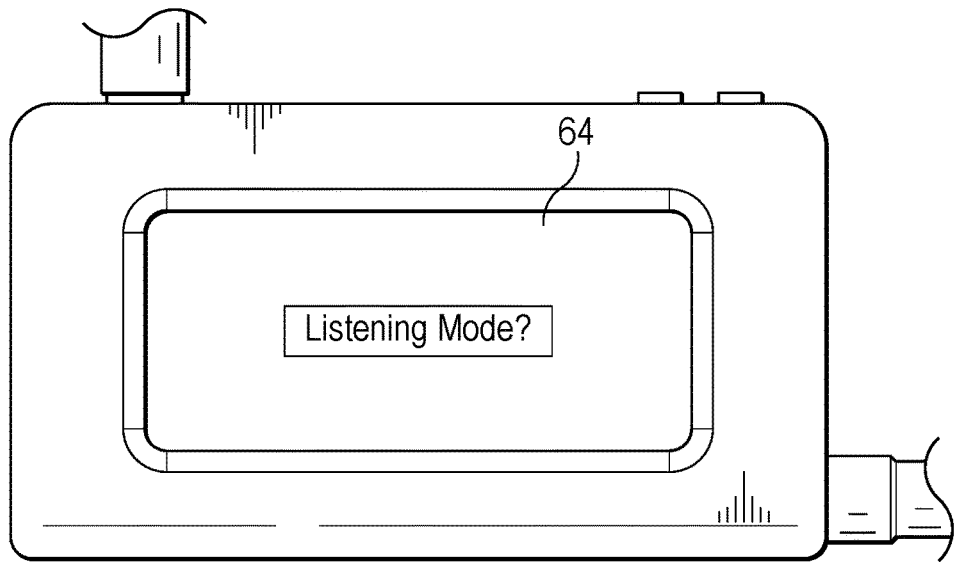
FIG. 8 is an exemplary screen of the controller of FIG. 1.
Figure 9:
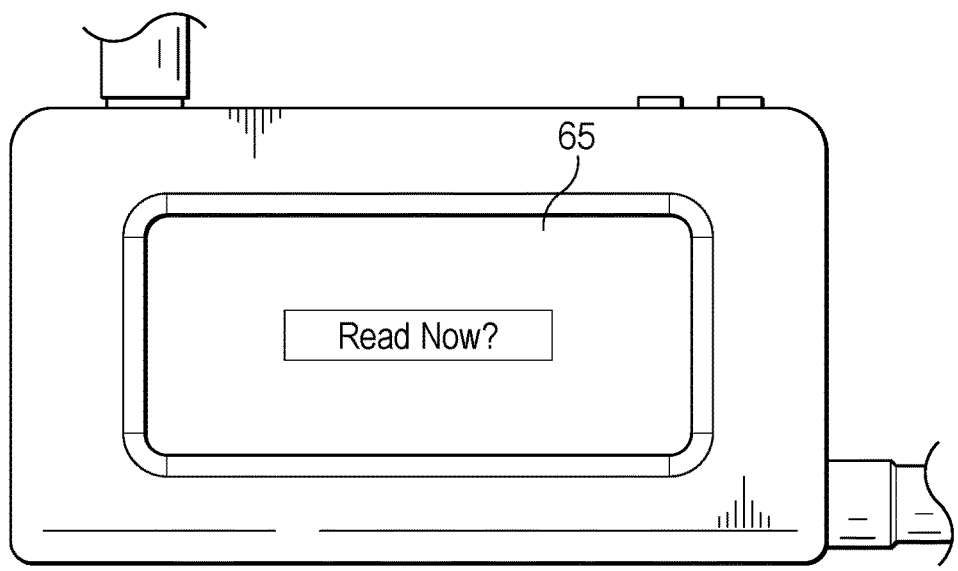
FIG. 9 is an exemplary screen of the controller of FIG. 1.

Referring to FIGS. 7-9, different exemplary screens of the controller are illustrated. FIG. 7 depicts a controller screen 63 displaying information about a particular network, including network name, IP address, Gateway, subnet information, DNS information, signal strength, and signal-to-noise ratio ("SNR").

In an exemplary embodiment a controller may be configured by a user to communicate information over a specific network. Using one or more of the menu buttons, a user may initiate listening mode. Referring to FIG. 8, an exemplary listening mode screen 64 is shown. When in listening mode, the controller may broadcast its own Wi-Fi network. The user may connect the controller's broadcasted network to the network chosen by the user, such that the controller can communicate wirelessly with the user's network. For example, through listening mode one or more controllers may be connected to a local wi-fi network in a hospital facility, allowing the one or more controllers to transmit information across the local wi-fi network. In other exemplary embodiments the controllers may communicate information over a cellular network.

Referring to FIG. 9, an exemplary reading mode screen 65 is shown. When reading mode is initiated by a user, the controller 12 provides real-time information on demand. Information is displayed on the display screen and transmitted over the network. Reading mode allows a user to perform a manual read on demand, while also providing a record of the manual read that may be used for auditing, reporting, or inspection purposes.

Figure 10:
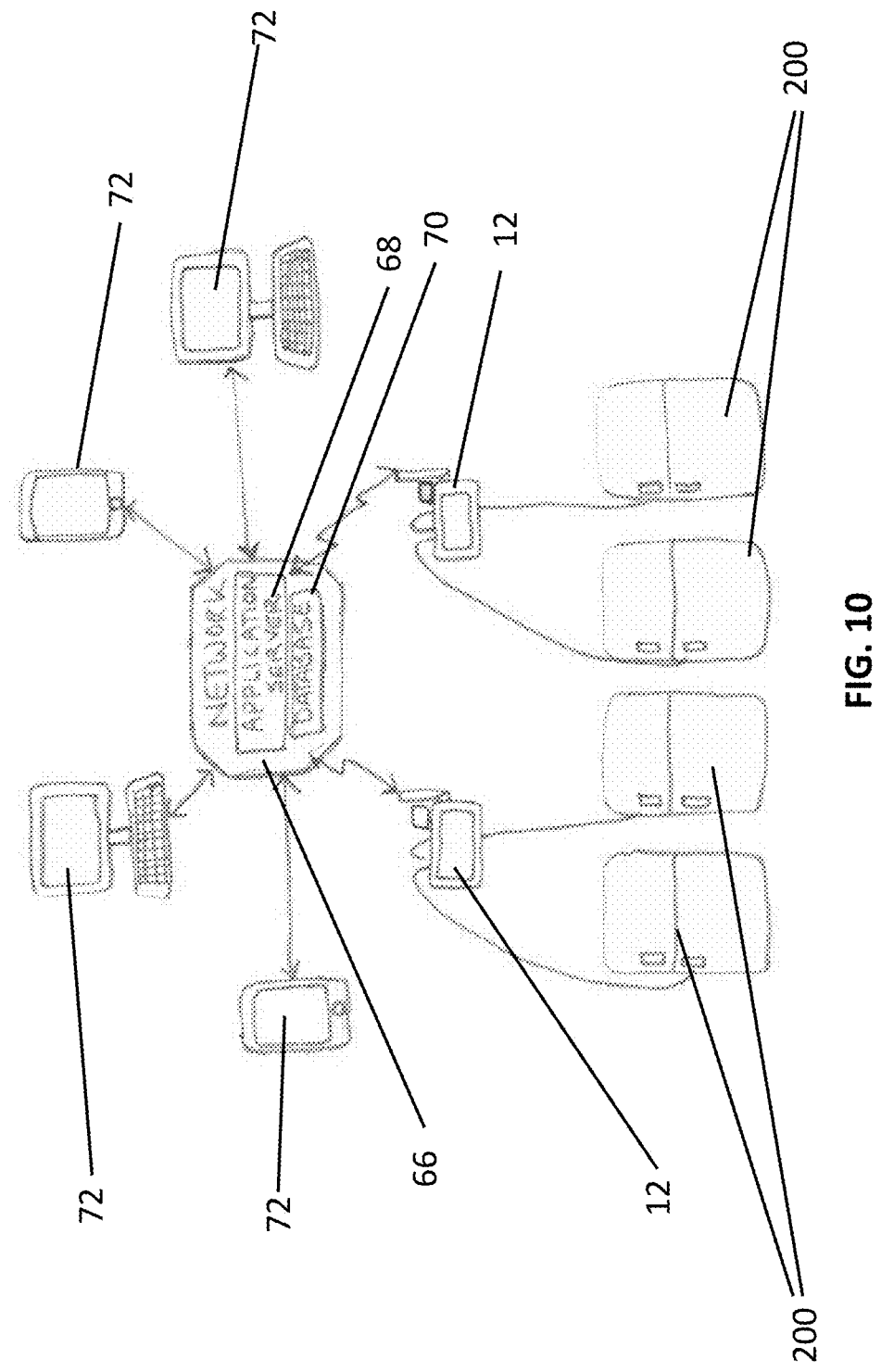
FIG. 10 is a diagram of an exemplary system for remote monitoring according to the inventive concept.

Referring to FIG. 10, an exemplary system for user-configured remote monitoring is depicted. Multiple controllers 12 associated with one or more sensor units 10 reading temperature information from different refrigeration devices 200 as well as ambient sensors may wirelessly communicate temperature and/or humidity data received from the sensor units across a network 66. Associated with the network 66 is an application server 68 running application software and a database 70 in communication with the application server 68. The database 70 may store information including, but not limited to, environmental data received from the controllers, policies and workflows created by users, user selections, user account and password information, user logs, and records of alerts, notifications, and other operations performed by the application server. One or more user devices 72 may communicate with the network 66 and allow a user to access the application software. The system is also able to push notifications regarding the status of one or more sensor units to one or more user devices. Exemplary user devices 72 include but are not limited to desktop computers, tablet computers, smart phones, and pagers. One of ordinary skill in the art will recognize that a variety of different user devices 72 may be used with the system without departing from the inventive concept. One of ordinary skill in the art will recognize that a variety of different server and system architecture could be employed without departing from the inventive concept.

FIGS. 11 through 17 depict exemplary software application pages according to an embodiment of a remote monitoring system. These pages may be accessed on a user device and allow a user to view various types of information, metrics, reports, and notifications related to the environmental data collected by the system, as well as the features, operation, and status of the controllers and sensors. Policy information and status information may also be provided to a user. In exemplary setting, the user viewing such information may be a pharmacist, pharmacy technician, nurse, quality control manager, or any other person involved in the monitoring of temperatures in one or more locations or overall facility.

Figure 11:
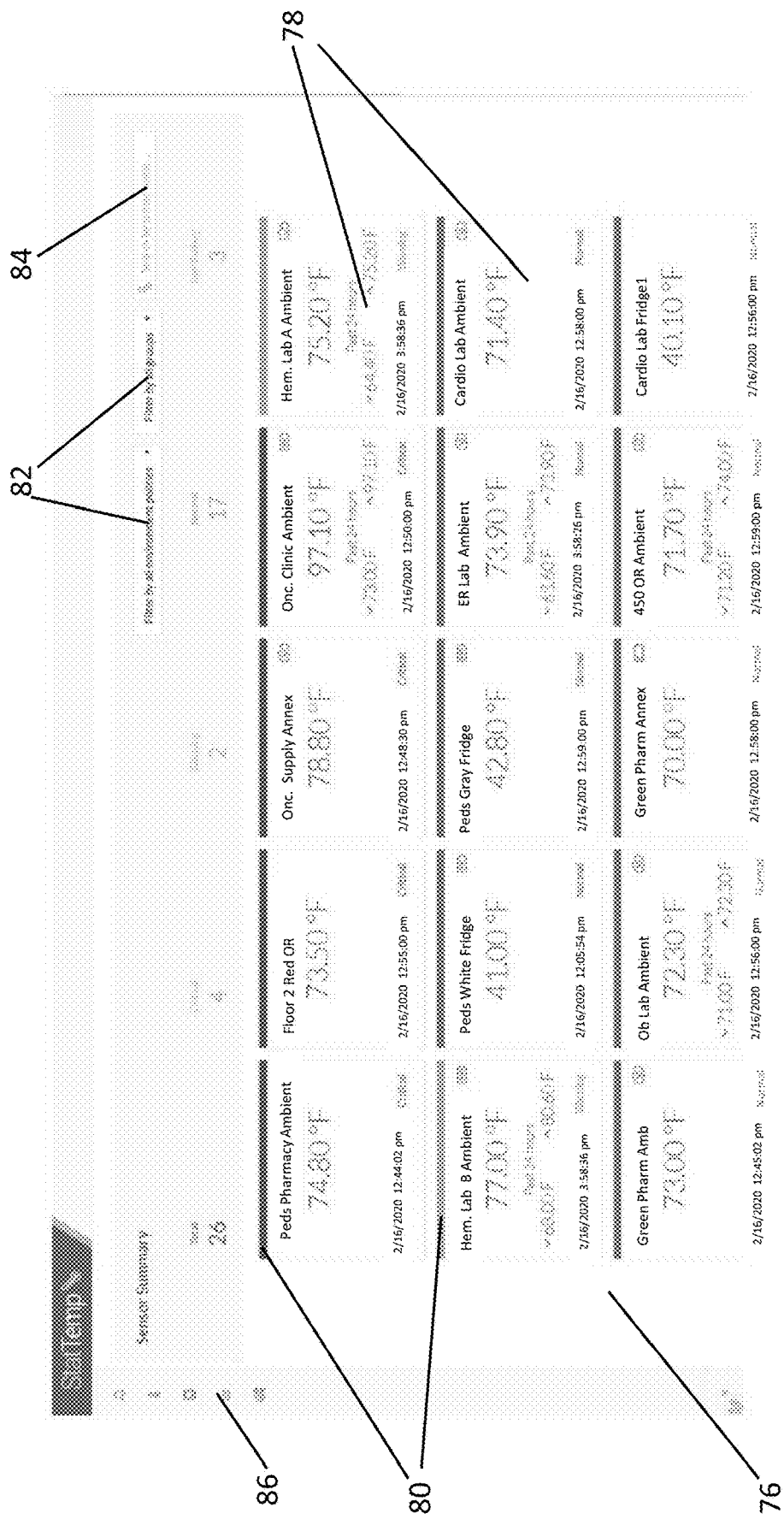
FIG. 11 is an example sensor summary page according to an exemplary embodiment.

Referring to FIG. 11, an exemplary "Sensor Summary" page 76 contains a plurality of information tiles 78 where each tile contains information about a particular sensor unit (both internal sensors and ambient air sensors). Status bars 80 at the top of each information tile 78 may identify whether each sensor unit is in a Critical, Warning, or Normal status (or other status hierarchy) depending on the color of the status bar. For example, Critical, Warning, and Normal status may be identified by the colors red, yellow, and green, respectively. Each information tile 78 may display the name of the sensor unit, the current temperature being read by the sensor unit, high and low temperature values read by the sensor over the past 24 hours (or other time frame), an indication of remaining battery life/power source pertaining to each sensor unit, and a written status. The Sensory Summary page 76 is able to provide a user with a general overview of the status of the various sensor units, and give immediate visual indication of any sensor units and related locations that may need attention (for example, an ambient air sensor unit that is reporting a temperature high enough to cause a Critical status). The Sensory Summary page 76 may also allow the client to utilize one or more filters 82 to narrow the information tiles 78 based on a particular environment policy, group, or other parameter. A search bar 84 may also allow the user to locate a sensor unit by name. A menu bar 86 on the side of the page allows a user to maneuver between different pages.

Referring to FIG. 12, a "Sensors" page 88 provides the user with additional information about sensor units, including their status, what controller they are connected to, current temperature, current humidity (if applicable), the time of last reading, and more. The Sensors page 88 may also provide the user with the ability to delete a sensor unit from the list if the sensor unit is no longer being used.

Figure 13:
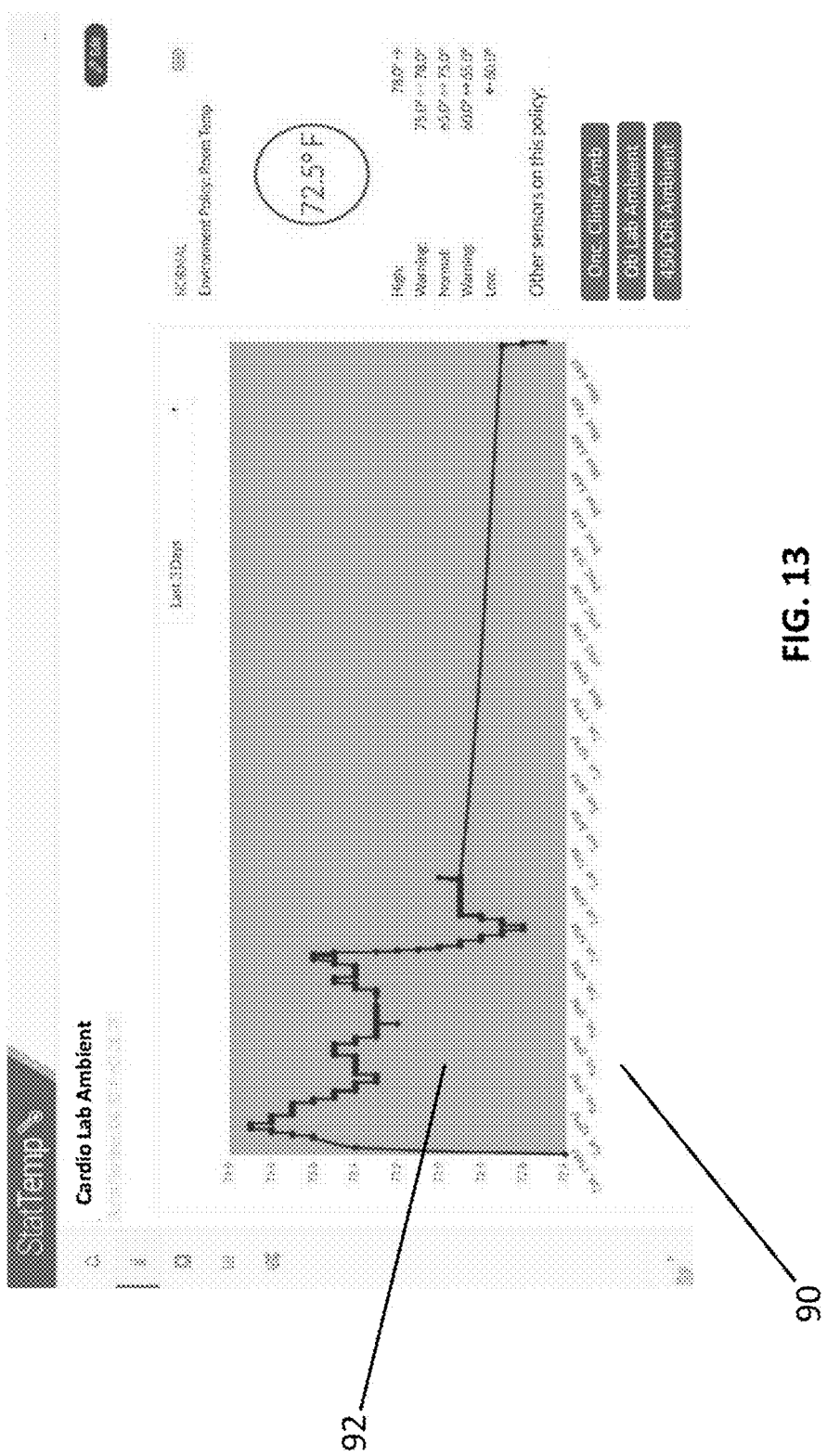
FIG. 13 is an example sensor detail page according to an exemplary embodiment.

The system may provide the user with detailed information pertaining to each sensor unit, which can be accessed by selecting a specific sensor name. Referring to FIG. 13, an exemplary sensor detail page 90 is shown. This page provides a graph 92 showing a recent history of temperature values obtained by the particular sensor unit, the current temperature value, the policy that the particular sensor unit is on (such as room temperature), and any alerts. It may also display to a user additional information about the policy, such as the various temperature ranges associated with High, Normal, Low, and Warning for that particular policy. The sensor detail page may also identify other sensors adhering to the same policy.

Figure 14:
FIG. 14 is an example controllers page according to an exemplary embodiment.

Referring to FIG. 14, an exemplary "Controllers" page 94 identifies the active controllers by name, which sensor unit(s) are connected to each controller, the battery levels and/or charging status, and the last read. This page may also give the user the ability to delete a controller that is no longer needed. The page 94 also provides a search bar 96 to allow a user to search for a particular controller.

Figure 15:
FIG. 15 is an example controller detail page according to an exemplary embodiment.

Referring to FIG. 15, an exemplary controller detail page 98 provides additional information regarding a specific controller that the user has selected. This page may show which sensors are associated with the controller, the battery level for the controller, whether the battery is charging, Wi-Fi strength, and WIFI Quality. Information tiles 78 for associated sensor units provide visual indications via color and text regarding the status of the sensor units. The information tiles 78 also identify the temperature value and may report recent historical high and low temperature values for a particular sensor.

Figure 16:
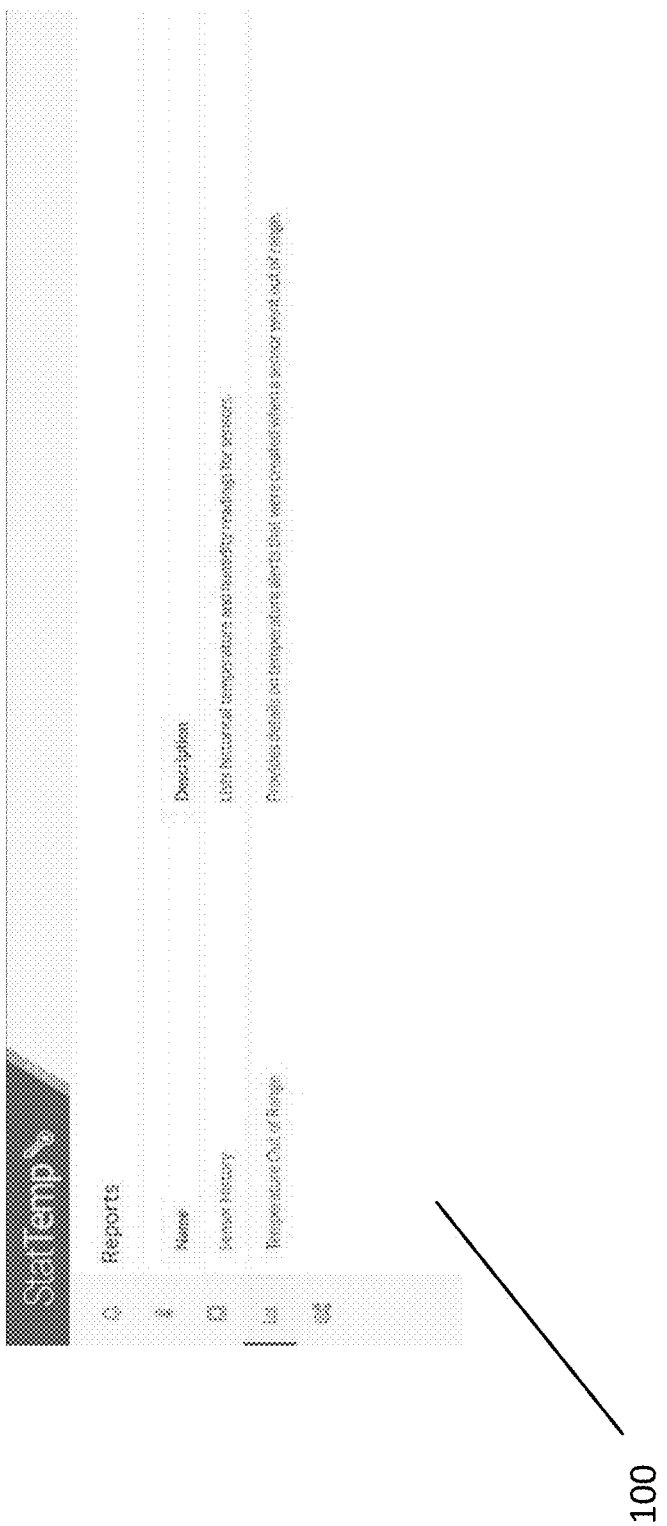
FIG. 16 is an example reports page according to an exemplary embodiment.

Referring to FIG. 16, an exemplary "Reports" page 100 allows a user to generate reports. Examples of reports that may be generated include reports regarding historical temperature and/or humidity readings for sensors, and reports of details regarding temperature alerts that were issued when a sensor unit went out of range. One of ordinary skill in the art will recognize that a variety of customized reports may be generated by a user to present information pertaining to the sensor unit readings, alerts, and more.

Figure 17:
FIG. 17 is an example alerts page according to an exemplary embodiment.

Referring to FIG. 17, an exemplary embodiment of an "Alerts" page 102 is shown. This page may allow the user to view alerts that have been created that relate to one or more sensor units, or controllers. This page may allow a user to filter alerts to show the alerts that pertain to sensor units utilized in a particular facility, clinic, office, laboratory, or other physical location. A status search bar 104 allows the user to search alerts based on the severity of the alert. The user can also view alert details such as what time the alert was created, and whether the alert has been resolved and/or acknowledged. An acknowledgement allows a user to identify that they have viewed a particular alert, and may communicate to other users that the issue causing the alert is being looked into. Once the issue is resolved the system may identify it as such, or a user may instruct the system to completely clear the alert from the alerts page. In exemplary embodiments all alerts, whether cleared or not may be recorded and saved in the database, and may appear on generated reports.

Figure 18:
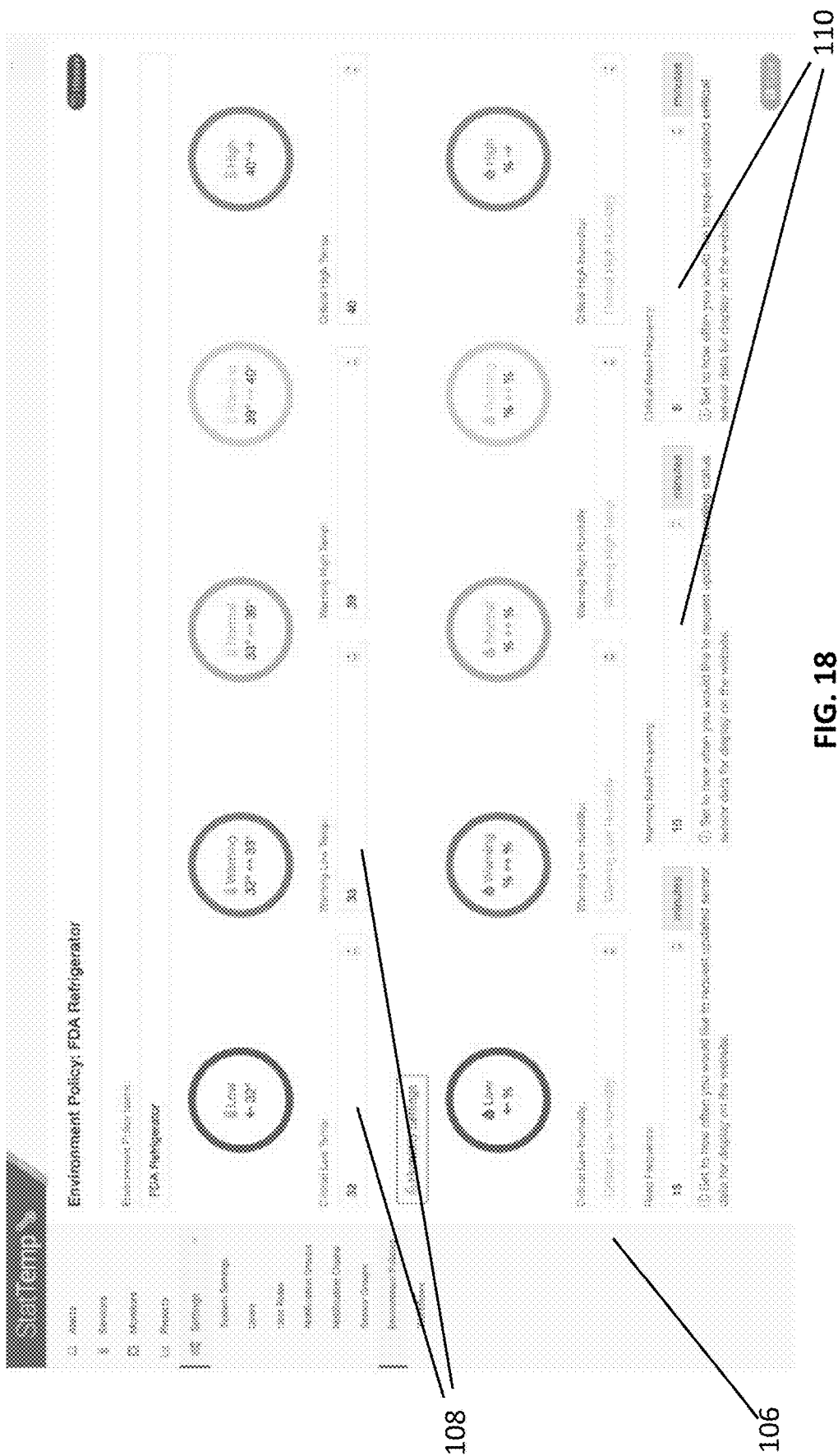
FIG. 18 is an example environment policy page according to an exemplary embodiment.

The system may allow users to create one or more environment policies that can be applied to one or more sensor units. An exemplary environment policy may establish the ideal (or "normal") temperature range for a location, refrigeration or freezer device, or application, as well as what higher and lower temperature points/ranges will cause a "warning" or "critical" status. Similar settings for humidity can also be selected by a user in order to create a humidity policy that can be applied to one or more sensors that detect humidity. The system may provide a user with a variety of options that can be configured by a user to create a desired policy for an environmental property. Referring to FIG. 18, an exemplary embodiment of an "Environment Policy" page 106 is illustrated, where the displayed policy is for a refrigerator sensor. Multiple temperature fields 108 on the page allow a user to establish what temperatures to associate with a range of temp categories such as "Critical Low", "Warning Low," "Warning High," and "Critical High." Multiple frequency fields 110 allow a user to select the read frequency associated with the temperature policies, which dictates how often a sensor takes a reading, and may change depending upon the temp category (Normal, Warning, or Critical). For the exemplary environment policy displayed in FIG. 18, the read frequency is set to every 15 minutes if the temperature is in the "normal" range, every 10 minutes if the temperature is in the "warning" category, and every 5 minutes if the temperature has reached the "critical" category. However, a user may use this page to change the read frequency for a policy depending on whether the temperature is Normal, Warning, or Critical. This may result in exception-based logging, where the read interval is longer when the temperature is within an acceptable range (resulting in a Normal policy), but the interval is shortened when the temperature is outside of the normal range and a Warning or Critical policy is triggered. For example, a user may set the read frequencies such that the temperature is read once an hour during a Normal Policy, every 15 minutes under a Warning Policy, and every two minutes under a Critical policy. One of ordinary skill in the art will recognize that read intervals could be set to any number of hours, minutes, or even seconds as desired by a user during the creation of a policy. The environment policy page of FIG. 18 provides a user with the ability to also configure the humidity settings if the sensor is one that detects both temperature and humidity. Depending on the type of sensor a user may only configure a policy that pertains to temperature, humidity, or both. In exemplary embodiments a user may configure different read frequency intervals for temperature and humidity. For example, whereas temperature may be read at a frequency of every 15 minutes or less depending on the status category, humidity may always be read at a maximum of one-hour intervals and a minimum of 30-minute intervals depending on the status category.

One of ordinary skill will recognize that environment policies may be established in a similar manner for sensors detecting ambient temperatures. Environment policies may be saved in the one or more databases associated with the application server, as well as in the memory storage device of a controller. Storage of environmental policies in the controllers allows the controllers to continue monitoring environmental properties even in the event that the network is inaccessible, or the application server is otherwise unavailable. Even if no network is available to a controller, such as in the event of a power or internet outage, the controller may still display policy information and temperature or humidity values on its display screen, and record environmental data for later transmission to the network when connectivity issues are resolved.

Figure 19:
FIG. 19 is an example workflows page according to an exemplary embodiment.

In exemplary embodiments the system allows a user to view, define, configure, and modify workflows for various environmental events that might occur. FIGS. 19 through 30 illustrate exemplary workflow pages and popup windows according to an exemplary embodiment that may provide a user with the ability to establish a workflow comprising one or more workflow instructions that ultimately may be applied to one or more sensors and/or controllers. Referring to FIG. 19, an exemplary Workflow page 112 is illustrated. This page 112 lists the various workflows that have been saved into the system, and further identifies their status, name, event, and creation date. The Workflow page 112 provides the user with the option to delete workflows that are no longer desired. A search bar 114 allows a user to search for workflows by name or keyword.

Figure 20:
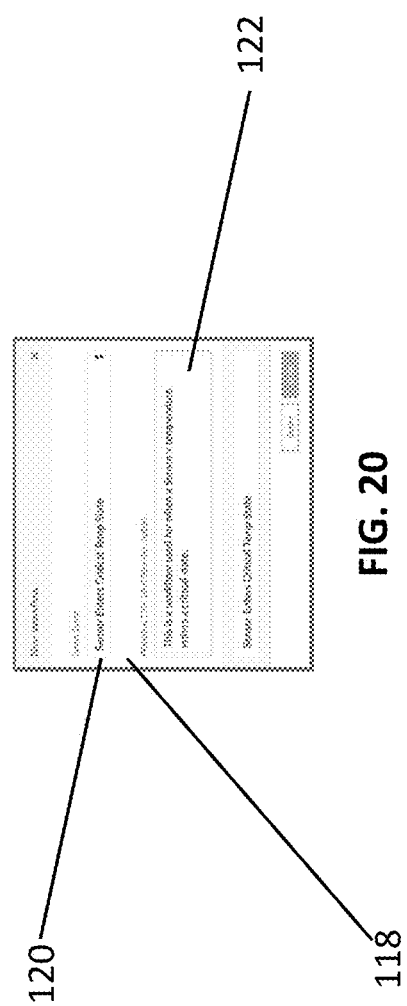
FIG. 20 is an example new workflow according to an exemplary embodiment.

The Workflow page 112 may provide the user with the ability to create a new workflow comprising one or more workflow instructions. This may be done by selecting a create button 116, which begins the workflow creation process. Referring to FIG. 20, an exemplary window 118 for the creation of a new workflow is illustrated. The workflow creation process may begin with the selection of a type of event. Options for event types may be provided to the user in an event type list 120. In an exemplary embodiment, event types may relate to an alert (alert is created, alert is acknowledged, alert is cleared, alert is resolved), a sensor (sensor enters normal temperature state, sensor enters critical temperature state, and sensor enters warning temperature state), or the power source (controller running on battery, controller running on power, controller battery is low, controller batter is ok). In other embodiments other types of events may be selected or created by the user. Once an event is selected, the user can enter a description of what the workflow is into a description field 122. This may allow other users to understand the meaning of the alert. For example, a description of the event "sensor enters critical temp state" may be that "this is a workflow used for when a sensor's temperature enters a critical state." The user may also have ability to give the workflow a specific title. After a workflow is created, the user can save it, delete it, or edit it. The workflow can also be made active by a user by applying the workflow to a particular sensor or controller.

Figure 21:
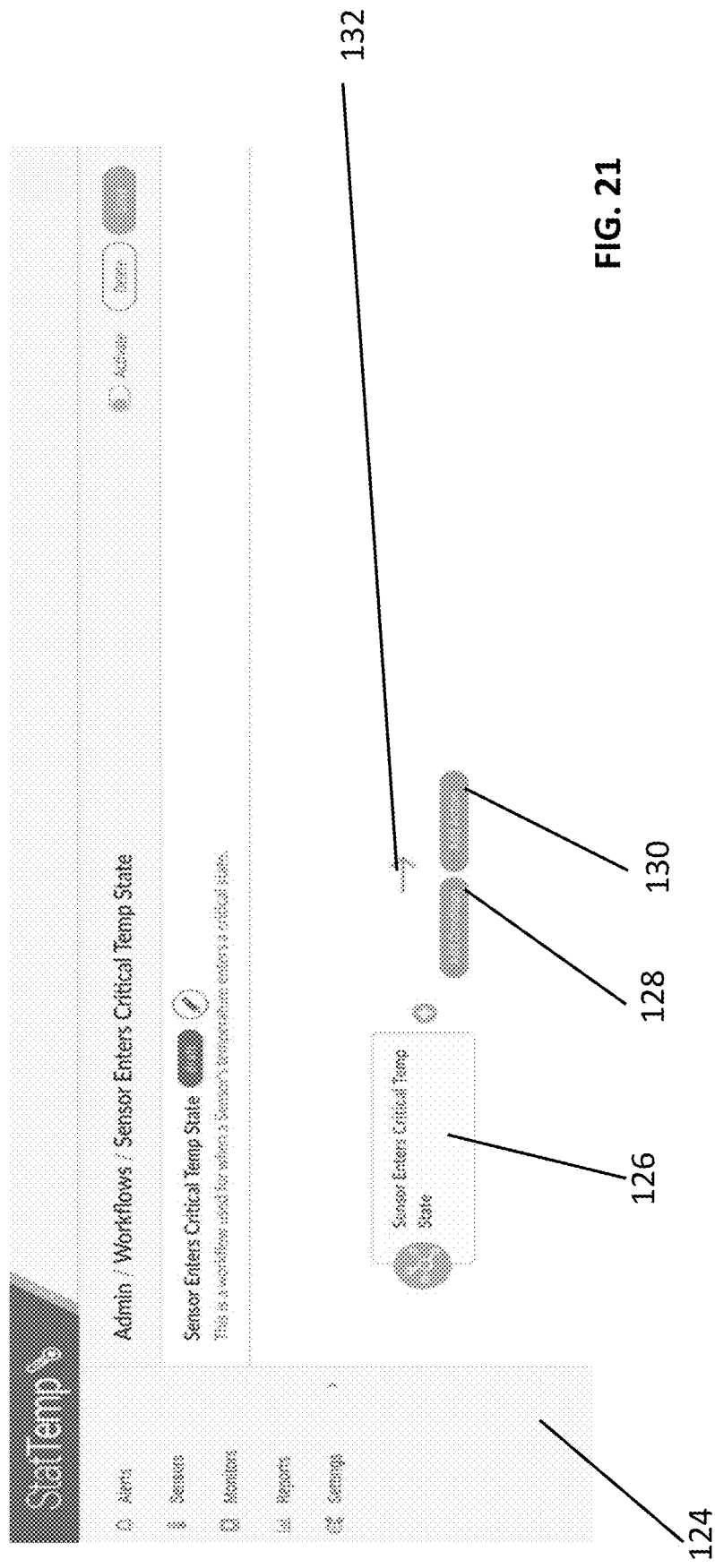
FIG. 21 is an example of a workflows page illustrating the creation of a workflow.
Figure 25:
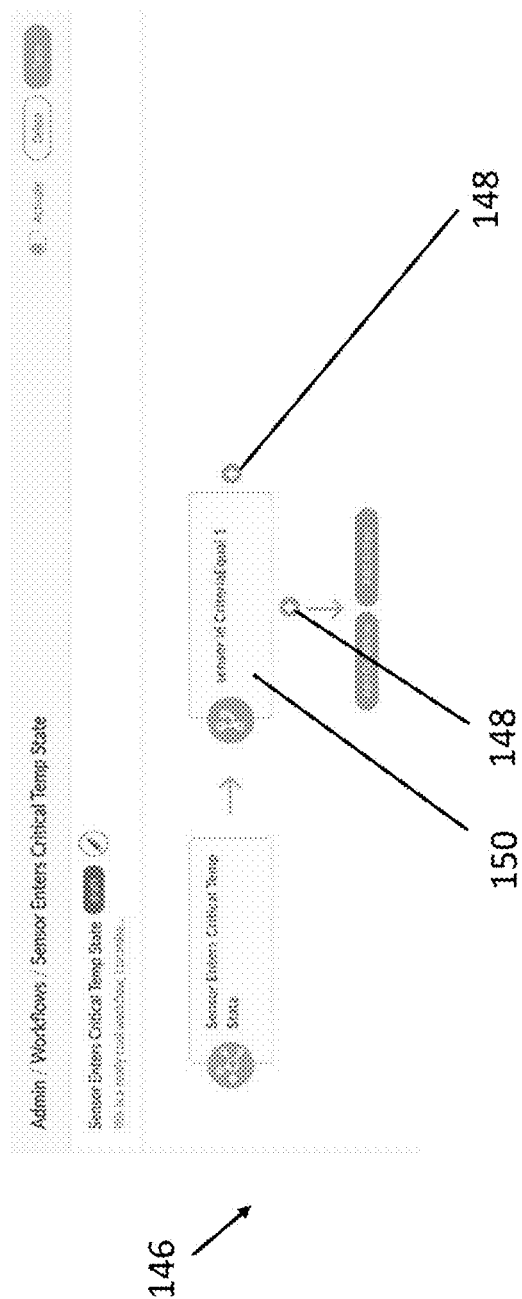
FIG. 25 is an excerpt of the workflows page of FIG. 17 after the creation of a workflow condition.

Referring to FIG. 21, an exemplary workflow creation page 124 depicting the initial stages of a new workflow is illustrated. Once a first event 126 has been identified in a workflow, the system may provide the user with the option to add a condition or add an action by selecting the appropriate button 128, 130. An arrow icon 132 may provide the user with a visual depiction of the logical direction that the workflow will be taking. Referring to FIG. 22, if a user selects the add condition button 128, a window 134 may appear with one or more subject options 136 available for the desired condition event. For example, sensor, day, and time. In this exemplary embodiment if "sensor" is selected the system may provide the user with a variety of subject type selections 138, which may be identifier, name, serial number, and groups. Upon selection of a subject type, the system may provide options for condition terms 140. In FIGS. 23 and 24, the user has chosen "sensor" as the subject, and "identifier" as the subject type, to which the system provides condition options of "is equal to" or "is not equal to." The user can select a condition option and then enter one or more sensor names in a sensor name field 142. Through these selections the user is able to build a condition based on the identity of sensor units. As shown in FIG. 24, the user is able to name the condition step in an input text field 144. They system may generate a condition step name automatically if none is entered, which can be edited by the user if desired. Once condition creation is completed, the system generates a visual of the layout of the updated workflow for the user. FIG. 25 is an exemplary page 146 showing a workflow layout resulting from the user selections of FIGS. 22-24, which provides the user with the ability to further add another condition or an action to the workflow by selecting the workflow icons 148. For example, and as shown in FIG. 25, by selecting the icon 148 under the condition box 150, the user could establish another step if the condition equals false, or create an action to perform. In addition, or alternatively, the user could add another step if the condition equals true by selecting the icon 148 to the right of the condition box. The further step could be another condition to check against or the creation of an action to perform.

Figure 26:
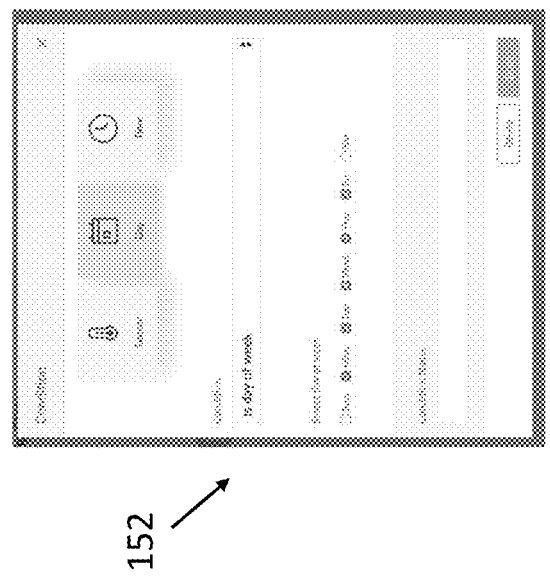
FIG. 26 is an example of a window for creating a workflow condition based on the day of the week.
Figure 27:
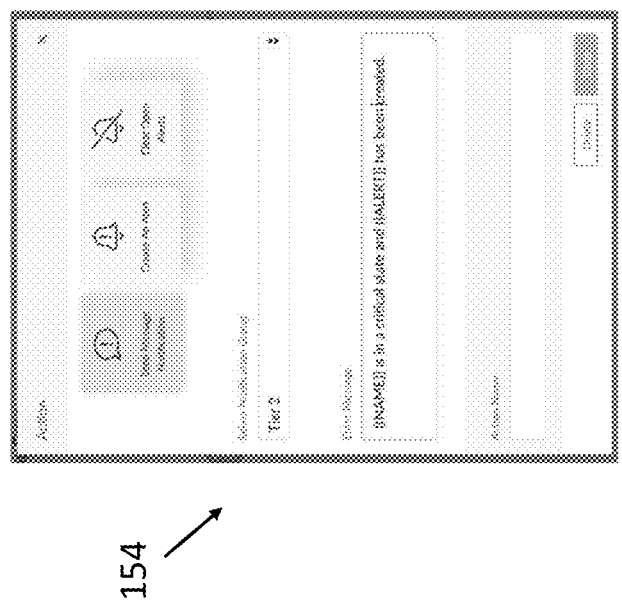
FIG. 27 is an example of a window showing the creation of a workflow notification action.

FIG. 26 depicts a window 152 presented to a user for adding a condition based on the day. The user is able to select one or more days of the week, and in the example selects Monday through Friday. FIG. 27 depicts a window 154 presented to a user for adding an action to perform if the second condition established in FIG. 26 were to compute as true. In this exemplary embodiment, the user is able to create an action where a message notification is sent to a particular group of users (referred to in the example as the "Tier 2" group), if the day of the week is Monday, Tuesday, Wednesday, Thursday, or Friday. Potential groups for receiving an alert may be provided as options to a user, such as in the form of a drop-down window. The user is able to use variables in the message field in order to insert the name of the sensor and the name of the alert into the message that is generated when the action occurs. Both notification groups and notification chains (multiple notification groups) may be created and saved in the system, for use by users when creating actions.

The window 154 also provides a user with the ability to create an alert, or clear an open alert.

Figure 28:
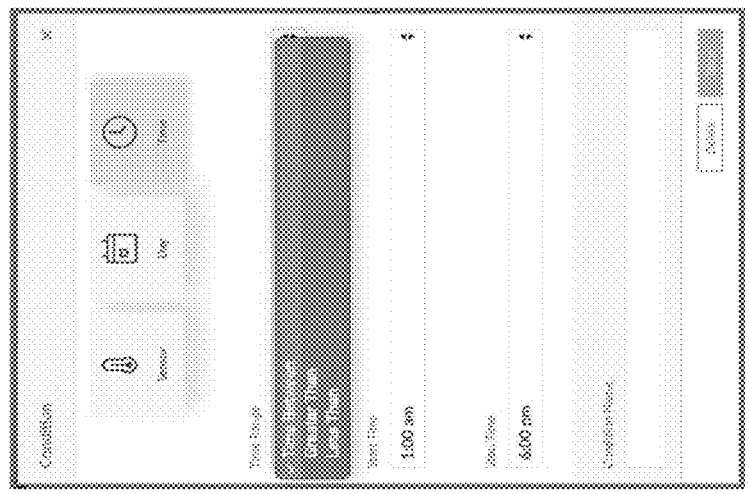
FIG. 28 is an example of a window for creating a workflow condition based on the time of day.

FIG. 28 illustrates an exemplary window 156 for creation of a condition for the time range starting at 1:00 a.m. and stopping at 6:00 pm.

Figure 29:
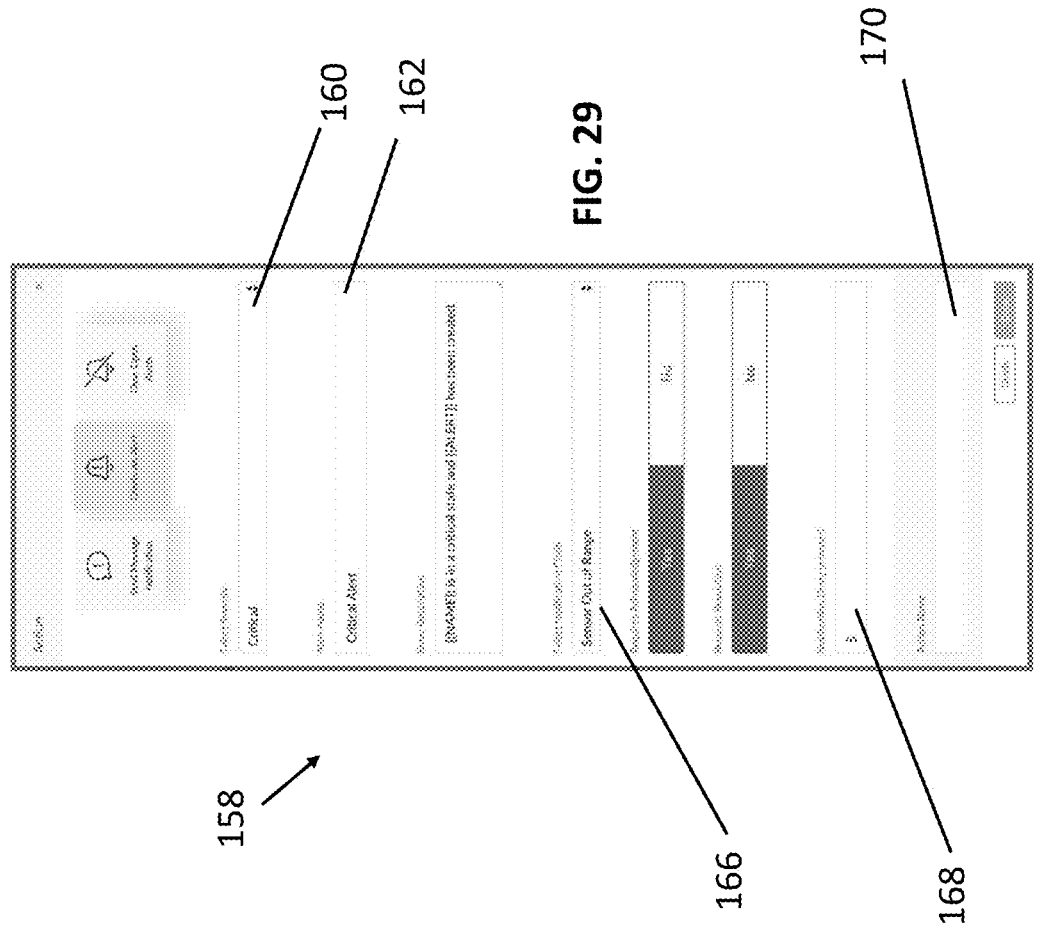
FIG. 29 is an example of a window for creating a workflow alert action.

FIG. 29 illustrates an exemplary window 158 for creating an action for addition to the workflow that will occur if all of the condition created in FIG. 28 equals true. A severity field 160 allows the user to dictate the severity/level of the alert, such as "Critical", and a name field 162 allows the user to enter a name for the alert. A description of the alert may be entered into a description field 164, and a notification chain is selected from a list of options 166. The user may then select whether the alert requires an acknowledgement and/or a resolution. The user may also set a notification delay 168, which is the time between the event occurring and the notification being sent. For example, in some applications it may be desirable to allow a few minutes to go by before sending an alert, to allow a user to potentially resolve the issue before others are notified. For example, if during an evening shift in a medical facility an alert is generated because a sensor unit placed in a refrigerator has detected a high temperature, a local user might quickly notice that the door is ajar and close the door to resolve the issue before there is a need to contact other users who are remote. If the event is resolved during the set notification delay time then no notification will be set. The user may also enter an action name into a name field 170.

Notifications may be provided to recipients in different ways, including but not limited to e-mail, SMS, MMS, text message, text to speech, auto-generated phone calls and messages, and voicemail. Notifications may also include audible noises initiated by a user device.

Figure 30:
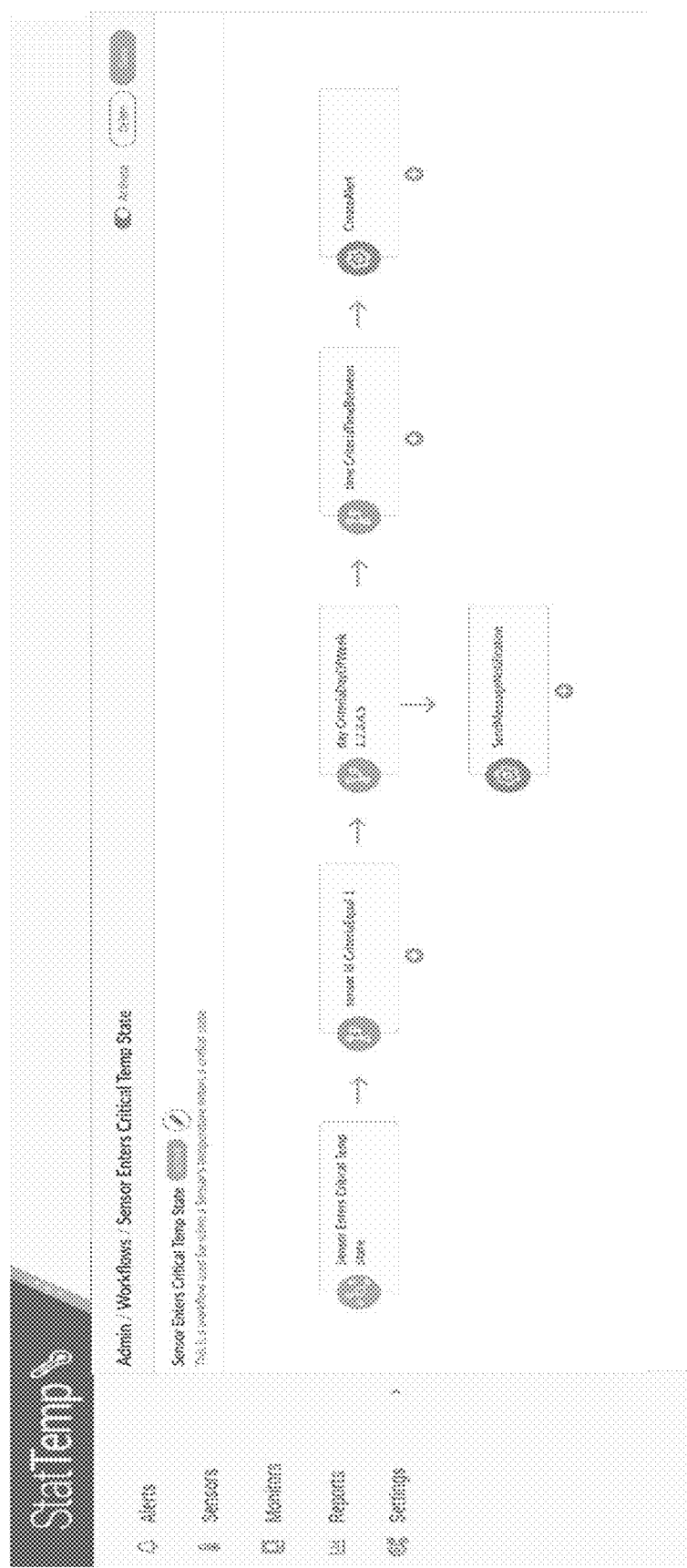
FIG. 30 is an example of the workflows page of FIG. 17 after the creation of multiple conditions and alerts.

FIG. 30 illustrates an exemplary workflow screen 164 that is based upon the exemplary conditions and alerts of FIGS. 20-29. The screen allows for the workflow to be further configured and/or edited as desired by a user. Once created, the workflow can be applied to one or more sensors. Workflows pertaining to controllers can be constructed in a similar manner, and applied to one or more controllers as desired. One of ordinary skill in the art will recognize that the system as illustrated and described herein allows users to configure various workflows and apply individual workflows to different components of an overall system. Additionally, more than one workflow may apply to a particular component. For example, a sensor may be subject to two workflows: one that dictates what notifications and alerts are to be sent in the event of a high critical temperature, and a second that dictates what notifications and alerts are to be sent in the event of a low critical temperature. Depending on the workflow and combination of relevant conditions and alerts, a user is able to control parameters such as the type of notifications issued, the conditions under which notifications are issued, which persons receive notifications, and the form in which notifications are sent. The user is able to configure different workflows not only for different hardware, but for different days and times of the week. In an exemplary use one workflow might apply during a first shirt on a weekday, and a second workflow might apply on a second shift of a weekend. User-defined configuration of workflows allows the system to provide effective monitoring and reporting tailored to staffing schedules.

The application software may allow a user to add a monitor by inputting the controller's serial number and providing a name for the controller. An association between a particular sensor and a controller is made by the system upon receiving the sensor's serial number during a reading. The system may automatically identify any sensors that it has detected. Sensors may be moved from one controller to another and identified by serial number each time they send a reading.

In an exemplary embodiment the application software is accessed by a user only after entering an approved user name and password. User access and user roles may be defined such that some users may have broader permissions than others. For example, it may be desirable to only provide authorization to certain users to create and modify workflows, while allowing all users to view temperature and humidity information, status information, and alerts. User names and passwords may be stored in the database associated with the application server.

It will be evident that there are additional embodiments and applications which are not disclosed in the detailed description but which clearly fall within the scope of the appended claims. The specification is, therefore, intended not to be limiting. The present invention may be embodied in other specific forms without departing from its spirit or essential characteristics. The described embodiment is to be considered in all respects only as illustrative and not restrictive. All variations that come within the meaning and range of equivalency of the claims are to be embraced within their scope.

The invention claimed is:

1. An environmental monitoring system for monitoring at least one selected environment from a plurality of selectable environments, said system comprising:
   at least one controller, said at least one controller configured to receive temperature data from at least one temperature sensor located in a selected environment and transmit said temperature data over a network, said at least one controller having a display for displaying information about said selected environment received from said at least one temperature sensor;
   a server in communication with said network, said server configured to:
      receive said temperature data;
      receive an environmental policy associated with said selected environment, said environmental policy identifying a first status associated with a first temperature range and a second status associated with a second temperature range;
      receive a workflow, wherein said workflow is associated with said selected environment, and said workflow requires said server to initiate an action when said at least one temperature sensor transmits temperature data that is within said second temperature range;
      compare said temperature data with said environmental policy to identify whether said at least one temperature sensor has said second status;
   wherein if said sever identifies that said at least one temperature sensor has said second status, said server executes said workflow and initiates said action; and
   wherein said at least one temperature sensor comprises a vessel containing a volume of thermal buffer that mimics the temperature properties of a pharmaceutical product.

2. The environmental monitoring system of claim 1, wherein said first status is normal and said second status is critical.

3. The environmental monitoring system of claim 2, wherein said action is to issue notification of said second status to a user device.

4. The environmental monitoring system of claim 3, wherein said notification is provided via one of the following methods: text message, e-mail, and voicemail.

5. The environmental monitoring system of claim 1, wherein said environmental policy includes a first read frequency associated with said first temperature range and a second read frequency associated with said second temperature range.

6. The environmental monitoring system of claim 5, wherein said server transmits said environmental policy to said at least one controller, and said controller storing said environmental policy in internal data storage.

7. The environmental monitoring system of claim 1 wherein said network is a wireless network.

8. The environmental monitoring system of claim 7 wherein said at least one controller and said at least one temperature sensor are remotely located from said server.

9. The environmental monitoring system of claim 1, wherein said at least one temperature sensor comprises a silicone-based digital temperature sensor.

10. A method for monitoring selected environments, the method comprising:
    selecting an environment to monitor;
    receiving environmental policy instructions from a user device, said environmental policy instructions pertaining to an environmental property detected by a sensor located in said selected environment, wherein said sensor comprises a vessel containing a volume of thermal buffer that mimics the temperature properties of a pharmaceutical product and is configured to transmit environmental data to a controller, and wherein said environmental policy instructions include status instructions that establish a first sensor status category and a second sensor status category;
    receiving a workflow associated with said first sensor status category, said workflow identifying at least one action;
    initiating a read of environmental data by said sensor;
    receiving said environmental data from said sensor;
    comparing said environmental data with said status instructions to determine if said sensor device has said first sensor status category;
    performing said at least one action if said sensor device has said second sensor status category; and
    displaying said environmental data on a display provided on said controller.

11. The method of claim 10, wherein said environmental property is temperature.

12. The method of claim 10, wherein said environmental property is humidity.

13. The method of claim 10, wherein said at least one action comprises transmitting a notification of said second status category to a user device.

14. The method of claim 13, wherein said at least one action comprises initiating an audible alarm.

15. The method of claim 10, wherein said workflow identifies a first of said at least one action to occur upon the existence of at least one of a first calendar event or a first group event; and said workflow identifies a second of said at least one action to occur upon the existence of at least one of a second calendar event or a second group event.

16. The method of claim 15, wherein said first and second calendar event is defined at least in part by the day of the week.

17. A user-configurable remote monitoring system, comprising:
    a first temperature sensor in communication with a controller;
    a second temperature sensor in communication with said controller;
    a server, said server configured to:
       receive from a user device first and second collections of user selections, said first and second collections of user selections each comprising at least one sensor status defined by a temperature range, and said first and second collections of user selections defining first and second environmental policies; respectively;

receive from a user device at least one workflow, said at least one workflow comprising at least one action to be executed upon the existence of a particular sensor status;

receive from said user device instructions to apply said first environmental policy to said first temperature sensor, and said second environmental policy to said second temperature sensor;

receive from said controller temperature data associated with said first and second temperature sensor;

compare said temperature data against said first and second environmental policies and identify whether one of said at least one sensor status applies to said first and second temperature sensor;

apply said workflow and execute said at least one action if said particular sensor status exists for either said first or said second temperature sensor.

18. The system of claim 17, wherein said at least one action comprises transmitting a notification of said particular sensor status to a user device.

19. The method of claim 17, wherein said workflow identifies a first of said at least one action associated with the existence of a first calendar event; and said workflow identifies a second of said at least one action associated with the existence of a second calendar event.

20. The method of claim 19, wherein said first and second calendar event is defined at least in part by the day of the week.

* * * * *